Figure 1:
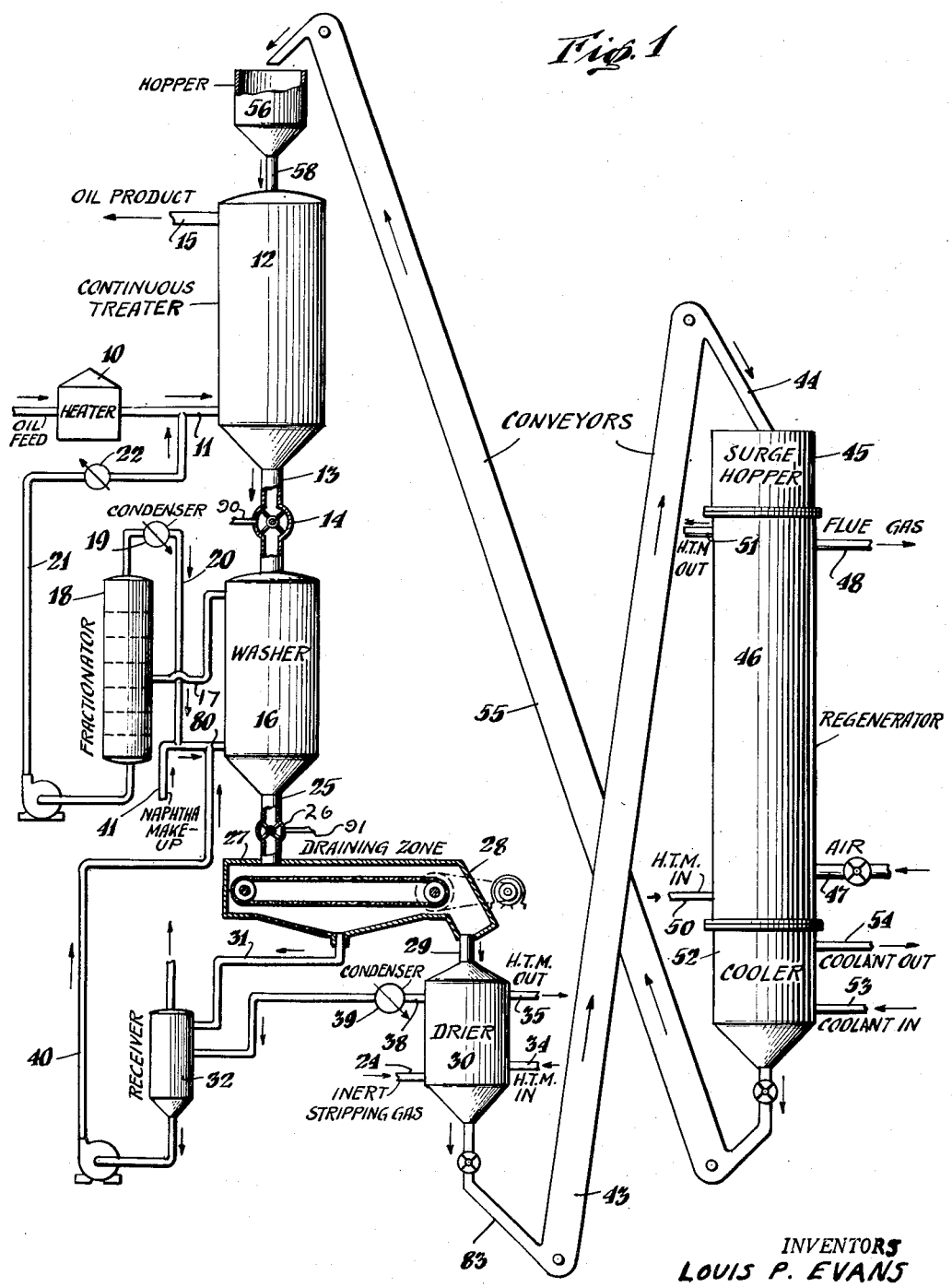

United States Patent Office 2,701,786
Patented Feb. 8, 1955

2,701,786

PROCESS FOR CONTINUOUS PERCOLATION OF PETROLEUM OILS

Louis P. Evans, John W. Payne, and Joe E. Penick, Woodbury, N. J., assignors to Socony-Vacuum Oil Company, Incorporated, a corporation of New York Application August 3, 1950, Serial No. 177,408

14 Claims. (Cl. 196—147)

This invention relates to a process for treating lubricating oils and lighter petroleum fractions of low asphalt content with solid adsorbents for the purpose of removing small amounts of impurities or undesirable contaminants therefrom so as to provide a single purified oil product, as distinguished from extraction and deasphalting processes and the like in which oils are fractionated into two or more liquid products. Typical of the purposes for which the oil may be treated by the method of this invention are decolorization, neutralization, removal of suspended, colloidal or dissolved impurities such as carbon or coke or oxygen and nitrogen containing impurities and other gum forming compounds, and improvement of demulsibility properties of the oil.

Heretofore, processes of this type have been conducted commercially by one of two methods, fixed bed percolation or contact filtration. In the fixed bed percolation process the oil is percolated downwardly through a fixed column of granular adsorbent to effect its treatment. After a period of time the adsorbent loses its decolorizing or treating effectiveness due to deposition of coky contaminants thereon and the percolation is stopped, the adsorbent is drained to remove free oil left in the percolation tower, then the adsorbent is washed free of adhering oil by means of a solvent, usually naphtha, the solvent is then removed by steaming and finally the adsorbent is removed from the percolation vessel and subjected to a burning regeneration at elevated temperatures to render it suitable for reuse. In the contact filtration process the liquid oil in heated condition is mixed with a measured amount of finely powdered adsorbent and after a period of contacting the oil is filtered from the adsorbent. The adsorbent is then discarded either with or without solvent washing. Both of these methods have serious disadvantages. In the fixed bed percolation process the rate of oil throughput per square foot of tower cross section is extremely low so that a large number of towers occupying a great amount of ground area are required to handle the refinery throughput requirements. Also, the adsorbent gradually undergoes a drop in efficiency due to the burning regeneration and it is customary to keep the material of different efficiency separate (i. e. first burned, second burned, third burned clay and so on). As a result, there may be as many as 10 to 20 different batches of adsorbent of differing decolorizing efficiency stored in separate bins in a single refinery. Another disadvantage arises from the fact that because of the inherent nature of the fixed bed percolation systems, it is generally not feasible to conduct the percolation at elevated temperatures where high treating yields could be obtained. The reason for this is that it would require prohibitively long periods for the percolator to cool down after use for oil percolation to a temperature at which wash naphtha could be introduced. Also, it is often necessary for men to work within the fixed bed percolators when the spent clay is being discharged and atmospheric or only slightly higher temperature levels are therefore obviously essential. As a result, the amount of adsorbent per treatment required to decolorize a given quantity of oil is notoriously much greater than in the contact filtration process. Moreover, many heavy stocks of high viscosity can be handled practicably only in a state of solvent dilution in the fixed bed percolation process, so that an expensive solvent recovery step is added to the process. The fixed bed percolation process is often incapable of handling viscous acid treated oils unless such oils have been previously subjected to chemical neutralization. At the low temperatures employed neutralization is incomplete. Attempts to percolate acid treated stocks which have been neutralized result often in clogging of the adsorbent bed and permanent damage to the adsorbent due to entrainment of the neutralizing liquid into the percolator in the oil being decolorized. In general the capital investment requirement for a fixed bed percolation process is substantially greater than that for a contact filtration process. On the other hand, the operating cost of the contact filtration is considerably higher, and this is principally due to the fact that in the commercial contact filtration process the adsorbent is thrown away after a single use. The reasons for this are several. Spent contact filtration clays are difficult to regenerate. Attempts to regenerate them by use of solvents have proved unsuccessful in that full regeneration is not usually obtained and in that the cost of this procedure is economically prohibitive. Commercial attempts to regenerate such adsorbents by burning have been unsuccessful because a serious permanent loss in adsorbent decolorizing efficiency is encountered. In addition to this, during the handling a substantial physical loss of the powdered material is unavoidable. As a result, it usually is customary to discard the spent contact clay after a single use and this poses a double problem of high clay cost for the process and of spent clay disposal. Large mounds of this material may be seen around many refineries. Another disadvantage of the contact filtration process lies in the fact that since the adsorbent is discarded after use substantial and costly loss either of adsorbed and occluded oil or of naphtha, if the clay is washed before discarding, is encountered. Still another disadvantage of the contact filtration method lies in the fact that while the method is capable of handling acid treated stocks to provide a treated oil of low neutralization number, at the same time the demulsibility properties of the resulting treated oil are poor. Both prior art methods characteristically require a considerable amount of handling, and man hours per unit of charge oil and consequent high operation costs.

It is a major object of this invention to provide an improved and more economical method for decolorizing or purifying lubricating oils and other petroleum oils of low asphalt content with solid adsorbents, which overcomes the above discussed disadvantages of present commercial processes.

Another object is the provision of a continuous percolation process for decolorizing and purifying asphalt free lubricating oils.

Another object is the provision of a practical continuous process for purifying light gas oils and domestic fuel oils.

Another object is the provision of an improved and continuous process for decolorizing and purifying lubricating oils of low asphalt content with adsorbents of palpable particulate form.

Another object is the provision of an improved method for neutralizing sour acid treated petroleum fractions by means of solid adsorbents without the requirement of a prior chemical neutralization step and without destruction of the other desirable properties of the oil.

Another object is the provision of an improved method for treatment of highly viscous lubricating oil fractions of low asphalt content with percolation adsorbents in palpable particulate form without the use of viscosity reducing diluents.

Another object is the provision of a continuous percolation process for decolorizing lubricating oils, over granular clay-type adsorbents, in which the adsorbent may be repeatedly reused without substantial loss in its decolorizing efficiency.

These and other objects of this invention will become apparent from the following description of the invention.

This invention in its preferred form involves a method wherein the petroleum oil feed of low asphalt content is caused to percolate under controlled conditions of temperature and rate upwardly through a column of downwardly gravitating granular adsorbent of palpable particulate form to effect removal from the oil of small amounts of high molecular weight and substantially semi-solid organic impurities and the like. Purified oil product is withdrawn from the upper end of the column and spent adsorbent is withdrawn from the lower end thereof. The spent adsorbent bearing the impurities is subjected as a gravitating column to countercurrent contacting with a suitable wash solvent such as naphtha free of entrained water to effect removal of occluded and absorbed oil from the adsorbent. The recovered oil which is in general equal to or superior in properties as compared with the feed oil and which is asphalt free or of very low asphalt content is recycled to the percolation column with the oil feed. The washed adsorbent is heated and purged with a gas or vapor which is free of condensed steam for removal of occluded wash solvent. It is then introduced into a regeneration zone while substantially free of condensed water vapor and subjected to a burning regeneration at controlled temperatures within the range about 900–1200° F. to effect removal therefrom of solid or semi-solid tarry and coky contaminant deposited thereon. The substantially moisture free regenerated adsorbent is then cooled and returned immediately to the percolation zone fully reactivated. If desired, according to the broader form of this invention, other suitable methods may be employed for effecting recovery from the spent adsorbent prior to its regeneration of the oil entrained from the treating zone by the spent adsorbent.

In conducting this method the adsorbent employed should be made up of palpable particles of size within the range about 4–100 mesh and preferably about 10–60 and still more preferably 15–30 mesh by Tyler standard screen analysis. The particles may take the form of pellets, capsules, pills, spheres or the like or granules of irregular shape such as are obtained from grinding and screening. The terms adsorbent in palpable particulate form and palpable particle form adsorbents as employed herein in describing and in claiming this invention are intended to generically cover particles of any or all of these shapes having substantial size as distinguished from finely divided particles. The pore structure of the preferred adsorbents are of such that while micropores are present, substantially more than 30 percent of the pore volume and preferably more than 60 percent of the total pore volume is occupied by macropores (i. e. pores having radii greater than 100 Angstrom units). Typical adsorbents which may be employed are fuller's earth, bauxite, bentonite and bone char, charcoal, magnesium silicate, heat and acid activated kaolin, and activated carbon. Synthetic silica or alumina or silica-alumina gel adsorbents and the like may be employed but preferably the preparation thereof should be controlled to provide a pore structure similar to that of the clay type adsorbents wherein substantially more than 30 per cent of the total pore volume is occupied by macropores. Gels of this type are described in United States Patent 2,188,007, isued January 23, 1940. It should be understood, however, that by proper control of the operation conditions, adsorbents of the synthetic gel type or otherwise having mostly micropores and less than 30 percent macropores may be employed in the process of this invention although with somewhat inferior results when used for lubricating oil purification. On the other hand, gels of this latter type have been found to give superior results in the treatment of distillate fuel oils by the method of this invention. Such adsorbents of this latter type are disclosed in United States Patents 2,384,946 and 2,106,744. The invention in its broadest form is intended to cover adsorbents of this type as well as the preferable adsorbents of larger pore structure.

Figure 2:
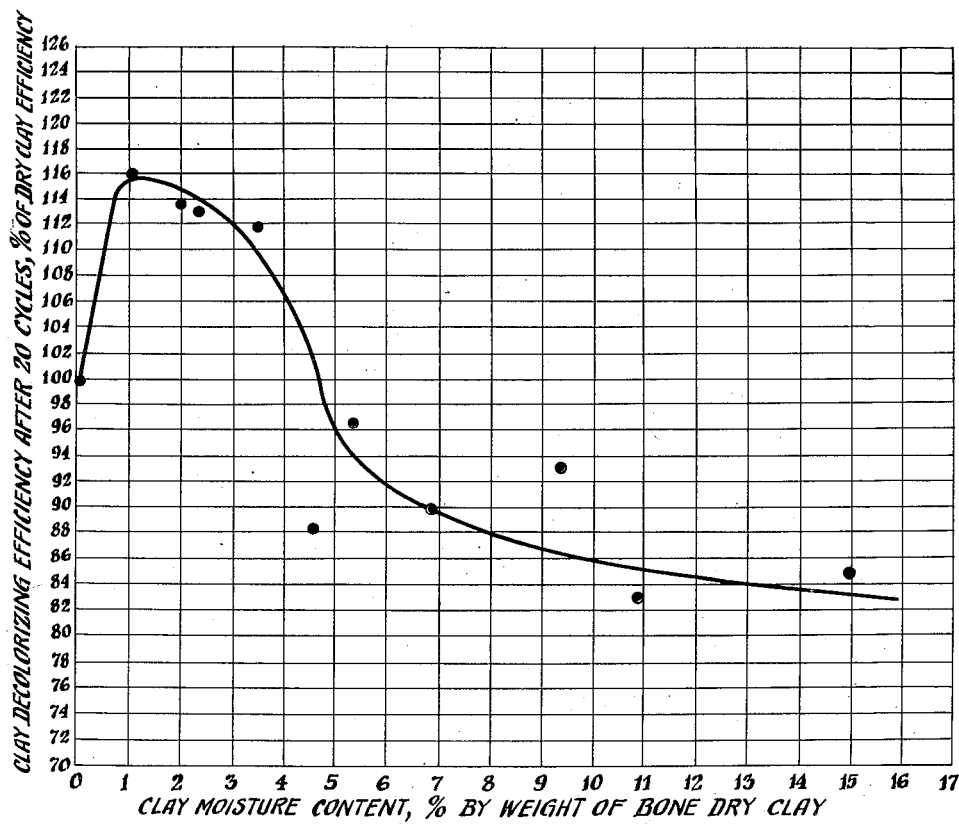

The invention may be most readily understood by reference to the drawings of which Figure 1 is a highly diagrammatic elevational view, of an arrangement for conducting the method of this invention, and Figure 2 is a graph showing the effect of moisture on clay adsorbent decolorizing efficiency in cyclic operations.

Referring now to Figure 1, a liquid oil feed such as a deasphalted petroleum lubricating oil which is substantially free of entrained moisture is passed through a suitable preheater 10 where it is heated to a suitable temperature for adsorbent contacting and is then passed via pipe 11 into the lower section of a columnar mass of adsorbent in granular form, for example maintained within the continuous treater 12. The oil is caused to flow upwardly through the columnar mass while the adsorbent is caused to flow downwardly by continuous withdrawal of adsorbent from the lower end of the columnar mass via pipe 13 on which is provided a motor operated measuring valve 14. The rate of oil flow in the column is controlled so as not to seriously interfere with the uniform countercurrent movement of the adsorbent granules relative to the liquid oil. Purified liquid oil product is withdrawn via pipe 15 from the upper section of the vessel 12 after gravity separation from the major portion of the adsorbent within the vessel. If desired, the oil product may be passed through a suitable blotter press to remove from it any traces of adsorbent which may have been entrained in the outlet product stream. The removed adsorbent may be discarded or may be passed to the upper section of washer 16 which is further discussed hereinafter. Spent adsorbent bearing a coky or tar-like contaminant deposit is withdrawn from vessel 12 via pipe 13 as a column of restricted cross-section relative to the cross-section of the column within the treating zone. A limited amount of liquid oil adsorbed in and occluded on the adsorbent and occupying the void spaces between the aggregated granules is entrained from the treating zone in the spent adsorbent outlet stream. This is removed from the adsorbent by subjecting it to a countercurrent washing with a suitable moisture free non-polar solvent such as petroleum naphtha free of entrained moisture in the washer 16. The adsorbent flows as a columnar mass downwardly through the washer while the naphtha entering via pipe 80 passes upwardly through the columnar mass. Naphtha and removed liquid oil pass from the upper section of washer 16 via pipe 17 to the fractionator 18 wherein the naphtha is stripped from the oil. The naphtha is removed from the top of the fractionator 18 and after being condensed in condenser 19 is recycled to the washer 16 via pipe 20. While not shown in the drawing, it may be desirable to provide a receiver and pump along the pipe 20 so that part of the naphtha may be recycled as reflux to the fractionator. The recovered liquid oil passes from the bottom of fractionator 18 and is pumped through pipe 21 back to the oil inlet to the lower section of the continuous treater. An exchanger 22 may be provided on pipe 21 for adjustment of the temperature of the recycled oil or the oil may be passed through heater 10 along with the original feed. The recovered oil so recycled is usually not substantially different from the original feed in color and like the feed is substantially free of asphalt and entrained moisture. The recycled oil is eventually recovered as purified product in the stream leaving the upper section of the treater via pipe 15, so that there is obtained only a single ultimate liquid oil product from the continuous treater, the only other material which is permanently removed from the treater being adsorbent and a coky contaminant deposited thereon which is not removed from the adsorbent in the washer and which is of such composition as to be unrecoverable as purified oil product. Also, there may be left on the washed adsorbent a small percentage of liquid oil which is not removed by the washing step. The spent adsorbent bearing naphtha and the coky contaminant and sometimes traces of liquid oil flow from the bottom of the washer via pipe 25 at a rate regulated by measuring valve 26, and falls onto a moving screen belt or other type of continuous draining mechanism in draining zone 27. The moving belt passes continuously over spaced rollers and is of mesh size adapted to permit passage of liquid therethrough while retaining the solid adsorbent granules. The latter fall from the end of the belt through a funnel-type passage 28 into pipe 29 feeding a continuous drier 30. The drained naphtha is passed from draining zone 27 via pipe 31 to a receiver 32. If desired the draining zone may be eliminated and the adsorbent passed directly from the washing zone to the drying zone. The adsorbent passes downwardly through drier 30 wherein it is heated by indirect heat transfer to a temperature suitable for removal of the adsorbed naphtha by vaporization. A suitable heat transfer fluid such as high pressure steam or a molten metal or inorganic salt is delivered via pipe 34 to heat transfer tubes (not shown) within the drier. The heat transfer fluid is withdrawn from the tubes via pipe 35. The adsorbent may flow through the drier as a columnar mass or it may be maintained as a fluidized body during its passage through the drier. In the latter event, a suitable aerating gas such as flue gas, nitrogen, superheated steam, or in some cases air is introduced via pipe 24 near the bottom of the drier and passed upwardly therethrough at a rate sufficient to maintain the adsorbent as a fluidized or boiling bed. In this case, there is no true countercurrent flow of solids and fluid as there is in the treating zone, because of the free columnar movement of the granules in the fluidized bed. The aerating gas which also aids in stripping the naphtha from the adsorbent is withdrawn along with naphtha via pipe 38, and passes through condensor 39 to receiver 32. Noncondensed gas is withdrawn from the top of the receiver and recovered naphtha is pumped from receiver 32 via pipes 40 and 80 back to the washer. Any make-up naphtha required in the washer is introduced via pipe 41. The gas withdrawn from receiver 32 may be recycled to the drier if desired. Adsorbent bearing only a coky contaminant deposit is withdrawn from drier 30 in substantially dry-moisture free form and passed through pipe 83 to conveyor 43 by which it is conducted to a point from which it may flow via duct 44 to a regenerator surge hopper 45. The conveyor may take the form of a conventional bucket elevator, a belt conveyor or a pneumatic conveyor. Granular adsorbent passes downwardly as a substantially compact column through the regenerator 46 and is contacted therein with an oxygen containing gas such as air introduced via pipe 47. Resulting flue gas is withdrawn from the kiln via pipe 48. The adsorbent temperature is maintained at a level sufficiently high to effect the required removal of the contaminant, i. e. down to about 0.5 to 2.5 percent by weight measured as carbon or less, but below a heat damaging level at which the adsorbent would be sintered or would suffer permanent damage in its decolorizing efficiency. The temperature control may be effected by removing excess heat from the kiln by means of a suitable heat exchange fluid supplied via pipe 50 to heat transfer tubes (not shown) within the kiln and withdrawn therefrom via pipe 51. Examples of suitable fluids for this purpose are low melting point metallic alloys, mixtures of inorganic salts such as nitrates and nitrites of sodium and potassium, steam, or other gases. Regenerated moisture-free adsorbent passes through a cooler 52 wherein it is cooled by indirect heat transfer to about the desired oil treating temperature. Heat exchange fluid enters tubes (not shown) within cooler 52 via pipe 53 and leaves the tubes via pipe 54. Examples of heat exchange fluids useful for this purpose are water, low melting point alloys, or inorganic salt mixtures, steam, air, or the lubricating oil feed prior to its charge to the treating zone. The adsorbent after cooling is transferred by conveyor 55 to a supply hopper 56 located above the treater. The moisture free adsorbent then flows by gravity through pipe 58 onto the upper end of the column maintained within the treater so as to maintain its surface level substantially constant.

In the operation of star valves 14 and 26 there is a tendency for some gas to be forced by the valves into the portions of pipes 13 and 25 above the valves. If desired, in order to prevent this each of the valves 14 and 26 may be driven in such a manner that there is a pause in its rotation as each material receiving pocket comes in line with the pipe 13 or 25. During the pause in rotation gas carried in the pocket which will next receive material from the treater may be removed by evacuation via pipes 90 and 91. By this procedure the pumping of gas up into the treater 12 and washer 16 by the valves 14 and 26, respectively, is avoided. It will be undertsood that other suitable means known to the art may be substituted for the star valve arrangements for confronting the flow of spent adsorbent from the treater 12 and of washed adsorbent from washer 16.

It is contemplated that within the broad scope of this invention the arrangement of the apparatus and the design thereof may be modified somewhat from that specifically described hereinabove. For example, while the recovery of entrained oil from the adsorbent by means of solvent washing followed by adsorbent drying is the preferred form of the invention, it is also contemplated that in some operations the washing and drying steps may be eliminated and instead the oil may be recovered by heating the adsorbent and stripping it with a suitable gas, for example flue gas or hot naphtha vapors. In any event, care should be taken that the recycle oil is not seriously damaged or converted in the recovery step. It is also contemplated that the washing step may be conducted in other ways, for example, the spent adsorbent may be delivered onto a perforated moving belt while a wash solvent is sprayed onto it. If desired, the adsorbent may be drained prior to the washing step as well as subsequent thereto. Instead of moving belt drainers continuous filters or centrifuges may be employed. The drier also may be modified, for example the heat transfer tubes may be omitted and the heat for the drying supplied simply by passing preheated flue gas or other suitable inert gas upwardly through the adsorbent mass. Also, instead of the drier shown belt or tunnel driers properly adapted for recovery of the naphtha may be employed. We prefer to employ as the regenerator a kiln of the type described in United States Patents 2,226,535 or 2,226,578 issued December 31, 1940. However, it is contemplated that other known kiln constructions either of the multi-stage or single stage type may be employed provided the adsorbent temperature is properly controlled during its regeneration. A suitable regeneration system which may be employed is described in application Serial Number 626,423 filed in the United States Patent Office November 2, 1945, now U. S. Patent No. 2,506,545. In some arrangements the kiln temperature control and the adsorbent cooling step after the regeneration may be accomplished by passing a suitable heat exchange gas directly through the adsorbent mass so as to provide direct heat transfer rather than indirect heat transfer through tubes. Examples of suitable heat exchange gases for this purpose are air, flue gas, hydrogen or methane.

The operating conditions to be maintained in the several steps of the cyclic process of this invention vary somewhat depending upon the particular adsorbent and oil feed involved and the particular purpose of the treatment. In the continuous treater in order to provide a practical rate of oil throughput without disrupting the columnar mass of adsorbent it has been found important to maintain the oil viscosity in the treating zone not greater than (i. e. equal to or preferably below) a maximum expressed by the relationship $$Z = \frac{250,000 D^2}{U}\left(\frac{S_a}{1-F}\right)\left(1-\frac{S_L}{S_T}\right)$$

where Z is the maximum allowable viscosity in centipoises, D is the average particle diameter in inches (calculated by averaging the reciprocal of the particle diameters), U is the superficial oil velocity through the contacting zone in feet per hour (calculated on the basis of the total zone cross section when empty of adsorbent), $S_a$ is the adsorbent apparent density in grams per cubic centimeter (conveniently determined by pouring a sample of adsorbent into a graduated container without agitation of the container and then weighing a measured amount), F is the fraction of voids between the adsorbent particles under the same conditions at which the apparent density is determined, $S_T$ is the true density of the adsorbent particles in grams per cubic centimeter and $S_L$ is the density of the oil under the conditions existing in the contacting zone in grams per cubic centimeter. For best operations it is preferred to maintain Z equal to or less than the value $$\frac{125,000 D^2}{U}\left(\frac{S_a}{1-F}\right)\left(1-\frac{S_L}{S_T}\right)$$

In the above relationships the adsorbent particles should fall within the range about 0.0058 to 0.185 inch diameter. The average diameter of the adsorbent material should be preferably greater than 0.01 inch. The above relationships apply particularly to particles of irregular shape or granular form and for spherical particles the numerical constant in the relationship will be approximately 10–30 percent higher. Hence, while the maximum allowable viscosity may in some operations be somewhat higher than that indicated by the above relationships, nevertheless it will be apparent that control of oil viscosity within the range required by the above relationships will result in proper operation regardless of the adsorbent particle shape and the relationship may be regarded as broad in that sense. As examples it may be stated that for granular adsorbent within the range 4–100 mesh (Tyler scale) the range of oil viscosities required in the treating zone should fall within the range about 0.2–500 centipoises. For an oil superficial velocity in the treating zone of the order of about 4 feet per hour and for granular adsorbent of the type of fuller's earth (approximately 35 pounds per cubic foot apparent density as poured dry into a container without packing), falling within the size ranges 4–14, 14–28, 28–60 and 60–100 mesh (Tyler scale), the flowing oil viscosity in the treater should be maintained preferably below about 560, 50, 10 and 2.5 centipoises respectively. For 28–60 mesh material under the above conditions an oil viscosity of about 5 centipoises has been found to be highly satisfactory. The liquid viscosity may be controlled either by dilution of the oil feed with a miscible, low-viscosity cutting agent which is usually a nonpolar solvent such as a paraffinic naphtha, or carbon tetrachloride, or the liquid viscosity may be controlled by control of temperature in the treating zone. While in its broader aspects the invention is considered to include either of these methods, it is for reasons discussed hereinafter advantageous to exclude viscosity cuting agents or diluents from the treating zone and to effect the viscosity control solely by control of the treating temperature. In general, the treating temperature may fall within the range of atmospheric temperature to 700° F. but generally the treating temperature should be maintained below the flash point of the oil as measured by the A. S. T. M. Cleveland Open Cup Method. It has been found that somewhat higher temperatues are often required to effect proper neutralization of acid treated stocks than are required for decolorization treatments. In any case, the conditions of temperature and pressure in the percolator should be maintained such that there is no appreciable vaporization of the oil in the treating zone.

The pressure maintained in the treater is usualy of the order of atmospheric pressure. The relative amounts of adsorbent and liquid oil feed passed through the treater depend upon the degree of decolorization or other treatment desired. In general, the volumetric ratio of liquid oil measured at 60° F. to adsorbent (packed density) walls within the range 0.3 to 30. The method for determining the bulk packed density of granular adsorbents is disclosed in an article entitled "Macropore size distribution in some typical porous substances," by L. C. Drake and H. L. Ritter, Industrial and Engineering Chemistry, Analytical Edition, vol. 17, Number 12, pages 787–91, 1945. Also article entitled "Some physical properties of activated bauxite," by H. Heineman, K. A. Krieger and W. S. W. McCarter, Industrial and Engineering Chemistry, 38, 839 (1946).

The superficial velocity of liquid oil through the treater should be within the range ½–20 feet per hour and preferably within the range 1–10 feet per hour. (Based on oil at treating temperature and free cross-sectional area of treater when empty.) In all cases, the oil velocity should be control'ed below that which would interfere with the downward direction of flow of the adsorbent particles. While some expansion in the columnar mass due to oil flow may be tolerated, oil velocities should be avoided which are so high as to cause the adsorbent particles to move upwardly through the treating zone since such high velocities would prevent true countercurrent contacting of the oil and adsorbent with resultant decrease in the efficiency of the treating process.

The vertical length of the adsorbent column within the treating zone should be about five feet or greater and preferably within the range about 10–50 feet. For reasons discussed hereinbelow the oil feed to the treating zone should be substantially free of entrained water so that the treating zone may be maintained free of moisture. If necessary, the oil feed should be passed through a water separation zone prior to its introduction into the treating zone.

In the washing step any suitable non-polar solvent may be employed which boils substantially below the oil treated and at a sufficiently low temperature to permit recovery of the oi' therefrom in undamaged form. Typical of solvents which may be employed are carbon tetrachloride, normal heptane, normal octane, petroleum naptha boiling within the range 100 to 400° F. and carbon disulfide. We prefer to employ a paraffinic naphtha boiling within the range about 210–300° F. The washing step may be conducted at atmospheric pressure or at higher or lower pressures and at any temperature below that at which substantial vaporization of the solvent occurs, for example 60–250° F. in the case of the preferred naphtha wash medium. It has been found that the volumetric ratio of naphtha to adsorbent charged to a washer of the type shown in the drawings may be within the range 0.6 to 3.0 and preferably 0.8 to 1.5. The naphtha superficial ve'ocity through the washer should be of the order of 1–30 feet per hour. The height of the adsorbent column in a washing zone of the type shown in the drawing should be within the range about 5–20 feet.

In the drying zone, the pressure is preferably near atmospheric. The temperature to which the adsorbent need be heated depends upon the boiling range of the washing solvent and the amount of stripping vapor employed in the drying zone. The linear velocity of added gas flow in the drier may vary from nothing at all where the adsorbent is maintained as a compact bed to a velocity of the order of 0.2 to 10 feet per second depending upon adsorbent particle size and density where the adsorbent is maintained as a fluidized bed.

The regeneration zone may be operated at pressures ranging from 0–100 pounds per square inch gauge, low pressures being preferred. The temperature in the regeneration zone should be controlled at all times above a minimum required for contaminant combustion at a practicable rate which minimum depends upon the nature of the deposit and the stage of its removal. In order to accomplish a proper regeneration of the adsorbent, its temperature should be maintained above 900° F. during the later portion of the regeneration. Also, the temperature of the adsorbent should be controlled below a heat damaging level. The heat damaging level varies depending upon the type of adsorbent involved, being of the order of about 1200° F. for clays of the fuller's earth type and of the order of 1400° F. for bauxites.

It has been found that clay type and synthetic inorganic gel type adsorbents suffer gradual, permanent loss in percolation decolorizing and treating efficiency by subjection to repeated cycles of wetting with liquid water followed by removal of water, i. e. hydration and dehydration. This is shown by Figure 2 in which there is plotted the efficiency of the clay for decolorizing a typical lubricating oil after 20 hydration-dehydration cycles against the moisture added to the clay in each of the hydration cycles. These data were obtained by passing moist air through dried 30–60 (Tyler analysis) fuller's earth existing at room temperature to hydrate the clay to known amounts and then dehydrating the clay by heating it to 1050° F. in a muffle furnace. The hydration and dehydration steps were continued through 20 cycles for each point and the decolorization efficiency was then determined by percolation of a standard Mid-Continent base lubricating oil stock. As shown in Figure 2, the efficiency of the clay drops off very rapidly when the amount of liquid water picked up by the clay prior to dehydration was substantially in excess of about 4–4.5 percent by weight. (Based on dry basis of clay heated to 1050° F.) It was found that these results may be expected whether the clay is hydrated by wetting with distilled water, by spraying the clay with a fine mist of water or by passing moist air through the cool clay. Also, it was found that the use of steam to strip naphtha from the washed clay at atmospheric pressure prior to regeneration resulted in substantial loss in the clay decolorizing efficiency over a number of cycles. It was found that in the continuous cyclic percolation process described herein, the decolorizing efficiency of the clay adsorbent will gradually decrease in like manner over a period of cycles if the clay is permitted to take up substantially in excess of about 4–4.5 percent of its weight of water at any point in the cyclic system. On the other hand, when moisture is substantially excluded from the system, at least to the extent of never permitting the water on the clay from exceeding about 4.5 percent by weight of the clay (on 1050° F. dry basis), the clay may be used over and over again in the cyclic system without serious loss in its decolorizing or treating efficiency. It was found that synthetic silica alumina gel bead form adsorbent similarly suffered a loss in efficiency when subjected to cycles of wetting with water followed by removal of water by heating. Hence, in the continuous percolation process it is important to carefully exclude moisture from each step of the cyclic process. Thus, the oil feed to the treating zone should be substantially moisture free. Entrained water in the feed should be avoided entirely. A small amount of dissolved water in the oil feed may be tolerated since this will rarely exceed about 0.05 percent by weight of the oil and this even for low adsorbent to oil ratio operation will not exceed about 0.5 percent by weight of the adsorbent. Such traces of water will be taken up by the adsorbent near the oil inlet level in the treater so that the major portion of the contacting in the treater is always in substantially total absence of water. The term "substantially moisture free" as employed herein in describing and claiming this invention is employed in the sense above indicated and does not exclude the presence of the indicated small amounts of dissolved water in the oil feed. The above applies similarly to the naphtha feed to the washing zone where again entrained moisture should be avoided but small amounts of dissolved moisture ranging up to about 0.05 percent by weight of the naphtha may be tolerated. The term "substantially moisture free" as applied to the wash solvent in describing and claiming this invention is employed in this sense. In the drying zone it is preferred to avoid the use of steam as a stripping gas. However, it has been determined that at temperatures of the order of 300-400° F. the moisture content of adsorbent in equilibrium with stripping steam is only 2-4 percent by weight of the clay. The adsorbent entering, passing through and leaving the burning zone should never be permitted to contact a moisture containing gas while the adsorbent is at a temperature below about 300° F. at atmospheric pressure. This applies also to the cooling zone following the burning zone. Summarizing, the temperature, pressure and amount of moisture present in all zones of the cyclic system should constantly be maintained in such relationship as to limit the moisture content of the adsorbent below about 4.5 percent and preferably below about 4 percent by weight.

While operation with substantially complete exclusion of moisture from all parts of the cyclic, continuous percolation system is a preferred form of this invention, nevertheless, it is contemplated that this invention includes in its broadest aspects certain improvements not limited to moisture excluding operations.

As will be noted from data presented hereinafter, the amount of oil removed from the treating zone along with the spent adsorbent and recycled to the treater is substantial and may occasionally be as great or greater than the amount of fresh oil charge to the treating zone. As a result, the success of this cyclic process depends greatly upon the efficient recovery of substantially all of this entrained oil in unimpaired form in the step or steps used for effecting the recovery of this oil from the spent adsorbent so that it may be recycled to the treating zone. Thus, when the washing and drying and fractionation steps are employed for effecting cycle stock recovery the operation within these zones must be carefully controlled so that the oil and also the solvent are effectively removed from the adsorbent and not burned in the regeneration zone and so that the temperature during the separation steps does not rise to a level at which the oil would chemically break down or suffer damage to its physical properties such as darkening of color, and decrease in viscosity and flash point and increase in carbon residue, or decrease in viscosity index. The recycle ratio to the treating zone in the process of this invention may fall within the range of about 0.02 to 2 volumes of recycle oil per volume of fresh oil feed. The recycle oil should be approximately equal to or superior to the fresh feed particularly in its physical properties such as color, viscosity, carbon residue and flash point. It is believed that the method disclosed herein of passing a substantially asphalt free oil upwardly through a column of downwardly flowing granular decolorizing and purifying adsorbent to effect removal of very small amounts of color bodies and/or other impurities from the oil followed by separation from the adsorbent of any liquid oil removed from the treating zone therewith and the recycling of any oil thus separated so as to provide a single liquid oil product which is withdrawn from the upper section of the treating zone is a new and novel method and one of the broader forms of this invention even without reference to the other portions of the cyclic process. It is contemplated that the recycle oil recovered from the used adsorbent may be recycled to the treating zone immediately upon separation from the spent adsorbent, or it may be accumulated in a storage reservoir over a period of time and then recycled either alone or in admixture with other oil in the form of a single oil feed stream to the treating zone.

It is further contemplated that in some less preferred operations, when the oil recovered from the spent adsorbent is substantially superior to the fresh feed (i. e. lower in color, viscosity or carbon residue, etc.) only a portion (usually a major portion) of this recovered oil may be recycled to the treating zone and the remaining portion may be withdrawn to storage as a second liquid product. In such an operation two liquid products would be obtained both of substantially lower color than the feed to the treating zone.

Table I hereinbelow lists the operating results and yields and the conditions maintained in the several steps of this cyclic process when it was employed for the decolorization of a solvent treated Mid-Continent bright stock and when it was employed for effecting the neutralization and decolorization of a sour, sulfuric acid treated Coastal distillate. The table also lists properties of the charge oils and of the oil products obtained from the treating zone.

*Table I*

| | A | B |
|---|---|---|
| Charge Stock | Solvent Refined Mid-Continent Bright Stock | Sour Acid Treated Coastal Distillate |
| Adsorbent | Fuller's Earth, 28-60 Mesh (Tyler Scale) | Fuller's Earth, 28-60 Mesh (Tyler Scale) |
| Treating Zone: | | |
| Temp., °F | 300 | 375. |
| Press., #/in.² Ga | 0 | 0. |
| Actual Oil Contact Time of oil with Adsorbent (hours) | 2.5 | 1.7. |
| Oil Velocity in Bed, Cu. Ft./sq. ft./sec | 0.0011 | 0.0016. |
| Ads. Vel., ft/sec | 0.00014 | 0.00081. |
| Bed Depth, Feet | 10 | 10. |
| Oil on clay leaving treator, vol./vol. of clay charge | 1.05 | 1.10. |
| Recycle Oil, vol./vol. fresh charge | 0.245 | 1.29. |
| Oil Viscosity in Treating Zone in Centipoises | 5.0 | 3.9. |
| Diluent in Oil Feed | None | None. |
| Oil Product Yield, #/# ads. Charge | 6.8 | 1.3. |
| Washing Zone: | | |
| Temperature, °F | 130 | 130. |
| Pressure, #/in.² Gauge | 0 | 0. |
| Wash Solvent | Paraffinic Naphtha, E. P. 300° F. | Paraffinic Naphtha, E. P. 300° F. |
| Solvent Feed, #/# of Adsorbent | 1.7 | 1.7. |
| Bed Depth, Feet | 10 | 10. |
| Drying Zone: | | |
| Temperature, °F | 400 | 400. |
| Pressure, #/in.² Gauge | 1.3 | 1.3. |
| Bed Depth, Feet | 6 | 6. |
| Stripping Gas | Flue Gas | Flue Gas. |
| Regeneration Zone: | | |
| Maximum Temp., °F | 1,150 | 1,150. |
| Pressure, #/in.² | 1 | 1. |
| Regeneration Gas | air | air. |
| Bed Depth, Feet | 20 | 20. |
| Wt. Percent C. Deposit on Entering Dried Clay | 5.7 | 7.3. |
| Wt. Percent C., Deposit on Regenerated Clay | 2.0 maximum | 2.0 maximum. |

Table I—Continued

| Charge Stock | A<br>Solvent Refined Mid-Continent Bright Stock | B<br>Sour Acid Treated Coastal Distillate | |
|---|---|---|---|
| Adsorbent | Fuller's Earth, 28-60 Mesh (Tyler Scale) | Fuller's Earth, 28-60 Mesh (Tyler Scale) | |
| Cooling Zone: | | | |
| Temperature Clay Entering, °F | 1,000 | 1,000. | |
| Temp. Clay Leaving, °F | 360 | 385. | |
| Pressure, #/in.²/Ga | 1 | 1. | |

| Oil Properties: | Chg. | Prod. | Chg. | Prod. |
|---|---|---|---|---|
| A. P. I. Gravity | 27.1 | 27.2 | 20.5 | 21.7 |
| SUV at 210° F | 102.6 | 98.3 | 172.7 | 140.9 |
| Viscosity Index | 93 | 95 | 53 | 54 |
| Color, Open Cup | 310 | 100 | | |
| Color, ASTM | | | Black | 5+ |
| Neutralization No | 0.01 | nil | 5.7 | 0.02 |
| ASTM Steam Emulsion Number, Conradson Carbon Residue | | | 1,200+ | 35 |
| | 0.4 | 0.3 | 0.9 | 0.6 |
| Flash Point, °F | 495 | 490 | 535 | 505 |
| Yields: | | | | |
| Oil Prod., Percent Wt. of Fresh Oil Chg | | 99.0 | | 93.4 |
| Coky Material Burned in Regen., Percent wt. of Clay-Coke Chg | | 3.6 | | 5.4 |
| Coke burned, Percent Wt. fresh Oil chg. (Calculated as Carbon) | | 0.5 | | 4.2 |

In the above operations oil entrained in the adsorbent leaving the treating zone was substantially entirely recovered from the adsorbent and returned to the treating zone as recycle oil. This oil was ultimately withdrawn from the upper section of the treating zone as part of the oil product so that there was only one liquid oil product ultimately obtained from the treating zone. Other than small handling losses the only constituents of the original asphalt free oil feed which were not contained in the single oil product were coky or tarry carbonaceous material deposited on the dried adsorbent entering the regeneration zone and a small amount of oil which was not removed from the clay in the washing step. In many operations it has been found more feasible to leave on the adsorbent oil amounting to about .5–2.0 percent by weight of the adsorbent and remove it along with the dry coky materials by burning rather than by further washing. The recycle oil recovered from the spent adsorbent by draining and washing was substantially free of asphalt and of properties similar to or superior to those of the original charge oil. For example, in the above Example A the Lovibond color of the original feed and of the recycle oil were 310 and 270 respectively; and the Conradson carbon residue of the feed and recycle were 0.4 and 0.3 respectively. In the case of Example B, the ASTM colors of the oil feed and recycle were black and 7 respectively and the Conradson carbon residue of the feed and recycle were 0.9 and 0.6 respectively. In the above operations by exclusion of condensed steam or water from contact with the adsorbent the adsorbent suffered no substantial loss in its treating efficiency. An adsorbent handling loss of up to about 2 percent per cycle occurs and fresh adsorbent may be added in this amount either continuously or at intervals. As is indicated in Table I results obtained therein were obtained by use of 28–60 mesh fuller's earth. The properties of 30–60 mesh fuller's earth are disclosed in an article entitled "Thermal activation of Attapulgus clay," by W. S. W. McCarter, K. A. Krieger and H. Heinemann, Industrial and Engineering Chemistry, volume 42, page 529, March 1950.

It will be noted from Table I that the treating temperature was controlled in the treatment of the solvent treated stock so as to maintain the oil viscosity at about 5 centipoises in the treating zone. In the case of the acid treated stock (Example B) the treating temperature was maintained somewhat higher than that required to provide a suitable oil viscosity in order to insure proper neutralization of the oil. In Table II below the effect of treating temperature on the neutralization of the oil is shown in the case of treating a sour acid treated Coastal distillate with fuller's earth.

Table II

| Example | C | D | Charge |
|---|---|---|---|
| Treating Zone Conditions: | | | |
| Temperature, °F | 350 | 375 | |
| Oil Contact Time, Hours | 1.9 | 1.7 | |
| Pressure, #/in.² Gauge | 0 | 0 | |
| Bed Depth, Feet | 10 | 10 | |
| Oil Viscosity in Treating Zone, Centipoises | 5.0 | 3.9 | |
| Oil Properties: | | | |
| Gravity, API | 21.3 | 21.7 | 20.5 |
| SUV at 210° F | 149.7 | 140.9 | 172.7 |
| Neutralization Number | 0.15 | 0.02 | 5.7 |
| Color, ASTM | 7 | 5+ | Black |
| Flash Point, °F | 530 | 505 | 535 |

As has been pointed out hereinabove, adsorbents other than fuller's earth may be employed in the process of this invention. As an example, a solvent treated Mid-Continent bright stock was treated with a granular 30–60 mesh (Tyler scale) bauxite adsorbent having a packed density of 55 pounds per cubic foot. In this operation the temperature within the treating zone was 300° F., the oil product yield in pounds per pound of adsorbent charge was 4.2, the oil velocity was 8.7 cubic feet per square foot of bed cross section per hour, the oil recycle amounted to about 0.36 volume per volume of original oil feed, the bed depth was 10 feet expanded during oil flow and 7.1 feet settled in absence of oil flow and the oil viscosity in the treating zone was 5 centipoises. The oil charge color was 300 Lovibond and that of the product was 100 Lovibond.

The advantages of the treating process of this invention over those of the prior art will be apparent from a study of Tables III and IV. The data in Table III compares the continuous percolation process of this invention with a conventional prior art fixed bed percolation process and with a conventional prior art contact filtration process as applied to the decolorization of a solvent treated Mid-Continent petroleum bright stock. The data in Table IV compares the same three processes as applied to treatment of a sour Coastal distillate which has been treated with sulfuric acid.

Table III

| Process | Continuous Percolation | Fixed Bed Percolation | Contact Filtration | Charge Stock |
|---|---|---|---|---|
| Adsorbent | Fuller's Earth, 28-60 Mesh (Tyler Scale) | Fuller's Earth, 28-60 Mesh (Tyler Scale) | Super Filtrol (Powdered) | |
| Operating Conditions in Treating Zone: | | | | |
| Temperature, Degrees F | 300 | 130 | 500 | |
| Pressure, Pounds Per Square Inch Gauge | 0 | 0 | | |
| Oil Contact Time, Hours | 2.5 | 9.7 | 0.5 | |
| Bed Depth, Feet | 10 | 24 | | |
| Percent Diluent in Oil Feed | 0.0 | 100.0 | 0.0 | |
| Volume Oil Per Hr. Per Volume of Treator | 0.20 | 0.025 | 0.85 | |
| Other Operating Data: | | | | |
| Naphtha Wash to Recover Entrained Oil | Yes | Yes | No | |
| Clay Regeneration and Reuse | Yes | Yes | No | |
| Wash Naphtha Used, #/# Adsorbent | 1.7 | 1.2 | 0.0 | |
| Naphtha Recovery Heat Load, B. t. u./# Oil Feed to Treator | 26 | 278 | 0.0 | |
| Yield of 100 Lovibond Color Finished Oil Product, #/# Adsorbent Per Pass | 6.8 | 3.9 | 9.4 | |
| New Adsorbent Make Up, # Adsorbent Per 100 # Oil Product | 0.29 | 2.6 | 10.7 | |
| Yield Oil Product, Percent Weight of Feed | 99.0 | 97.1 | 93.5 | |
| Net Loss of Potential Product Oil, Percent Weight of Fresh Feed | 0.14 | 0.50 | 6.5 | |
| Oil Properties, Product: | | | | |
| Gravity, Seconds API | 27.2 | 27.3 | 27.2 | 27.1 |
| SUV at 210 Degrees F | 98.3 | 98.5 | 99.3 | 102.6 |
| Viscosity Index | 95 | 94 | 94 | 93 |
| Color, Lovibond | 100 | 100 | 98 | 310 |
| Carbon Residue | 0.28 | 0.30 | | 0.4 |

Table IV

| Process | Continuous Percolation | Fixed Bed Percolation | Contact Filtration | Charge |
|---|---|---|---|---|
| Adsorbent | Fuller's Earth, 28-60 Mesh (Tyler Scale) | Fuller's Earth, 28-60 Mesh (Tyler Scale) | Super Filtrol (Powdered) | |
| Operating Conditions in Treating Zone: | | | | |
| Temperature, Degrees F | 350 | 375 | 130 | 600 |
| Pressure, #/Sq. In. Gauge | 0 | 0 | 0 | |
| Oil Clay Contact Time, Hours | 1.9 | 1.7 | 12.3 | 0.17 |
| Bed Depth, Feet | 10.0 | 10.0 | 24.0 | |
| Percent Diluent in Oil Feed | 0 | 0 | 100 | 0.0 |
| Volume Oil Product Per Hr. Per Vol. Treator | 0.2 | 0.2 | 0.020 | 0.71 |
| Other Operating Data: | | | | |
| Naptha Wash to Recover Entrained Oil | Yes | Yes | Yes | No |
| Clay Regeneration and Reuse | Yes | Yes | Yes | No |
| Wash Naphtha Used, #/# Adsorbent | 1.7 | 1.7 | 1.2 | 0.0 |
| NH₃ Neut. of Oil Prior to Percolation | No | No | Yes | No |
| Naphtha Recovery, Heat Load B. t. u./# Oil Feed to Reactor | 26 | 26 | 278 | |
| Yield, 100 Lovibond Color Finished Oil Product, #/# Ads. per Pass | 1.2 | 1.2 | 0.9 | 4.3 |
| New Ads. Make Up, # Ads. per 100 Oil Prod | 1.6 | 1.5 | 11.1 | 23.1 |
| Yield Oil Prod., Percent of Fresh Feed | 93.4 | 93.4 | 91.3 | 86.4 |
| Net Loss of Potential Product Oil, Percent Weight of Fresh Feed | 0.7 | 0.7 | 2.0 | 7.0 |
| Oil Properties: | | | | |
| Gravity, Sec. API | 21.4 | 21.7 | 21.5 | 21.9 | 20.5 |
| SUV at 210 Degrees F | 149.2 | 140.9 | 147.9 | 116.7 | 172.7 |
| Neutralization Number | 0.15 | 0.02 | 0.35 | 0.06 | 5.7 |
| ASTM Steam Emulsion Number | 800 | 35 | 1,200+ | 1,200+ | 1,200+ |
| Flash Point, Degrees F | 530 | 505 | 530 | 370 | 535 |
| Color, ASTM | 7 | 5+ | 8 | 8 | Black |
| Lovibond | 141 | | 200 | | |
| Sulfur, Percent | 0.3 | 0.3 | 0.3 | | |
| Pour, Degrees F | 35 | 35 | 35 | | |
| Carbon Residue, Percent Weight | 0.6 | 0.6 | 0.7 | | |

From the above Table III and IV it will be apparent that the process of this invention requires substantially less adsorbent for treatment of a given amount of oil charge, treated to specification, than does the conventional fixed bed percolation process. Moreover, as compared with the conventional fixed bed percolation process this invention permits a reduction in treating zone volume of about 75–95 percent for the same amount of oil treated. This means a very large reduction in the amount of percolation apparatus volume required for a given refining capacity. Also, because in the conventional fixed bed percolation process it is necessary to steam the fixed bed percolation towers at the end of each run to remove the bulk of the oil retained by the in situ adsorbent column, and again later to remove the wash naphtha. A resultant permanent decrease in clay decolorizing efficiency arises every time the adsorbent is regenerated by burning. Eventually the adsorbent efficiency falls off to such an extent that the adsorbent becomes valueless for further use and is discarded. Because of the inherent nature of the cyclic continuously moving adsorbent process of this invention the necessity for the steaming step at the end of the oil treatment is eliminated and steam in destructive quantities can be excluded from the entire cyclic process. As a result of this important difference, the requirements for fresh adsorbent make-up per volume of oil product are in the process of this invention of the order of only 10 percent of the requirements for fresh adsorbent make-up in conventional percolation processes. It will be apparent that since there is no substantial loss in adsorbent decolorizing efficiency after repeated cyclic use in the continuous process, it is necessary to store only one grade of adsorbent in the refinery as compared with the large number of grades stored in refineries employing conventional fixed bed percolation units. Also, because in the conventional contact filtration processes it is customary commercially to discard the clay after a single use, the new clay make up requirements of the continuous process of this invention are only of the order of 3-10 percent of the make up requirements for conventional contact filtration processes for the same amount of oil treated to the same specifications.

It will be further noted that in the fixed bed percolation process in order to provide rates of oil throughput through the percolation towers which are at least practical, it is often necessary, as shown in the examples, to dilute the oil feed with a viscosity cutting agent such as a naphtha. This, of course, not only reduces the volume of oil present in the percolation towers but also gives rise to a considerable heating cost in recovery of oil product from the diluent. In the process of this invention, the use of diluents in the oil feed is unnecessary and is usually undesirable. Hence, as indicated in the tables, the total solvent recovery cost including recovery from product and from oil washed from the clay in the washing step may amount in the conventional fixed bed percolation process to more than ten times the total solvent recovery cost in the process of this invention.

As indicated in Table IV, in the treatment of sour acid treated stocks, it is customary to neutralize such stocks by means of ammonia or caustic prior to treatment in the conventional fixed bed percolators. When this is done, sludge tends to settle on the clay in the percolator and cause the percolation rate to fall off to a level which is not practical. Even after preneutralization of the oil feed the neutralization number of the percolated oil may be undesirably high in the conventional fixed bed process as is shown in Table IV. Because of the fact that the adsorbent is continuously moving counter-currently to the oil, in the process of this invention, it is not necessary to preneutralize the sour oil feed. Also, because of the ability to properly control the temperature in the treating zone, desirably low neutralization numbers on the finished oil product are obtained. Looking again at Table IV for a comparison of the method of this invention with the conventional contact filtration process, it will be noted that while treatment of the sour stock by a conventional contact filtration process resulted in a product oil of low neutralization number, nevertheless the steam emulsion number is very poor indicating that the oil will form emulsions with water which may be difficult to break down. By contrast, in the process of this invention, a finished oil was obtained which was properly neutralized and also which had satisfactory demulsibility properties. This is of considerable importance in the production of many oil products for use in service where the formation of stable oil in water emulsions is undesirable. A turbine oil is a typical example. It will also be noted from Table IV that in the treatment of sour stocks the temperatures required to accomplish proper neutralization in the contact filtration process often result in an undesirably excessive decrease in viscosity and in the flash point of the lubricating oil product. On the other hand, even better neutralization is obtained by the process of this invention without excessive decreases in viscosity or flashpoint of the treated oil.

A further comparison of the results obtained in treating other petroleum oil stocks by the method of this invention and by the conventional percolation process under conditions actually employed in at least one large commercial refinery is contained in Table V. The adsorbent involved was 28-60 mesh (Tyler scale) fuller's earth. The advantages of the process of this invention in the case of every stock treated are apparent from the data in this table. Another important application of this invention is in the treatment of domestic fuel oils such as Number 2 fuel oil for effecting removal therefrom of small amounts of suspended solid materials, coky substances, unstable substances having coke forming tendency and sulfur compounds.

*Table V*

| Stock | Charge | Acid Treated Coastal Transformer Oil | | Charge | Acid Treated Coastal Transformer Oil | | Charge | Turbine Oil Blend of Solvent Refined Distillate and Bright Stock | | Charge | Turbine Oil Blend of Acid Refined Distillate and Bright Stock | |
|---|---|---|---|---|---|---|---|---|---|---|---|---|
| Method | | Continuous Percolation | Fixed Bed Percolation | | Continuous Percolation | Fixed Bed Percolation | | Continuous Percolation | Fixed Bed Percolation | | Continuous Percolation | Fixed Bed Percolation |
| Operating Data: | | | | | | | | | | | | |
| Yield Volumes Product Per Volume Clay Charge | | 9.0 | 3.1 | | 15.0 | 4.2 | | 1.43 | 0.62 | | 12.0 | 4.9 |
| Product Rate, Bbl./Day/Sq. Ft. | | 17.0 | | | 17.0 | | | 17.0 | | | 17.0 | |
| Temperature, Degrees F. in Treater | | 156 | 70-80 | | 130 | 70-80 | | 260 | 100-120 | | 270 | 100-120 |
| Properties of Oils: | | | | | | | | | | | | |
| Gravity, Sec. API | 33.5 | 33.8 | 33.8 | 27.6 | 27.5 | 27.7 | 29.4 | 29.6 | 29.5 | 26.0 | 26.0 | 26.1 |
| Pour, Degrees F | 10 | 10 | 10 | <−30 | <−30 | <−30 | 25 | 25 | 25 | 20 | 25 | 25 |
| Flash, Degrees F | 355 | 360 | 365 | 265 | 265 | 270 | 435 | 425 | 440 | 445 | 425 | 440 |
| Fire, Degrees F | 395 | 395 | 395 | 305 | 305 | 315 | 490 | 500 | 500 | 485 | 480 | 485 |
| SUV at 100 Degrees F | 78.2 | 79.1 | 78.9 | 55.3 | 55.6 | 464 | 449 | 440 | 622 | 612 | 597 | |
| SUV at 210 Degrees F | 37.0 | 37.1 | 37.2 | 36.4 | 33.7 | 33.7 | 61.9 | 61.4 | 61.1 | 67.5 | 67.1 | 66.5 |
| Viscosity Index | | | | | | | 99 | 100 | 101 | 88 | 88 | 88 |
| Color, Lovibond | 1.2 | 0.15 | 0.20 | 1.3 | 0.25 | 0.30 | 7.0 | 2.0 | 2.0 | 95 | 73 | 73 |
| Steam Emulsion No. ASTM | 50 sec. | 20 sec. | 20 sec. | 50 | 35+ | 35 | | | | | | |
| Neutralization Number | | | | | Nil | 0.01 | | | | Nil | 0.01 | 0.01 |
| Carbon Residue | | | | | | | | | | 0.4 | 0.6 | 0.5 |
| Sulfur, Percent | | .62 | .73 | | | | | | 0.20 | | | |
| Govt. Emulsion, Mins.: | | | | | | | | | | | | |
| Temperature, Degrees F | | | | | | | | 130 | 130 | | | |
| 3 cc. Distill H₂O | | | | | | | | 3 | 3 | | | |
| 3 cc. one percent NaCl | | | | | | | | 2 | 8 | | | |

The process of this invention is not only superior to all conventional processes for purifying and decolorizing petroleum oils by adsorbents as regards yields, product properties and operation but it is also far superior when compared with any of these conventional processes from a standpoint of economics. Table VI contains an economic comparison of the process of this invention with a contact filtration and a conventional fixed bed percolation process for processing to specification 3000 barrels per day of oils made up of a number of different stocks which are now processed by the conventional methods to various finished oils in one large commercial refinery. It will be noted from Table VI that the total operating cost of the conventional fixed bed percolation process for the same amount of oil treated is over twice as high and the operating cost of the conventional contact filtration process is almost four times as high as the total operating cost of the continuous cyclic process of this invention. Also, it will be noted that the total investment cost required for a system for conducting the process of this invention is substantially lower than the investment costs for either of the two conventional oil purifying and decolorizing processes.

Table VI

| Process | Continuous Cyclic Percolation | Conventional Fixed-Bed Solution Percolation | Conventional Hot Contacting |
|---|---|---|---|
| Relative Investment for Entire System Taking Total of Conventional Fixed Bed Percolation System as 100: | | | |
| Clay Regeneration | 9.5 | 14.3 | 0 |
| Filtration | 16.2 | 76.2 | |
| Naphtha Distillation | 2.9 | 9.5 | 0 |
| Total | 28.6 | 100.0 | 35.7 |
| Relative Operating Costs Per Day Taking Total of Conventional Fixed Bed Percolation Process as 100: | | | |
| Clay Regeneration and Make Up | 9.0 | 13.3 | 100.0 |
| Filtration | 31.0 | 78.4 | 66.7 |
| Distillation | 3.3 | 8.3 | |
| Total | 43.3 | 100.0 | 166.7 |

It should be understood that the specific examples of operating conditions, apparatus arrangement and applications of this invention are exemplary in character and are not to be construed as limiting the scope of the invention thereto.

We claim:

1. A continuous cyclic process for decolorizing lubricating oils which comprises: passing a granular clay adsorbent made up of particles within the size range about 4–100 mesh Tyler as a columnar mass of gravitating granules downwardly through a confined treating zone, introducing a liquid oil feed of low asphalt content into the lower section of said zone at the desired treating temperature and causing it to pass upwardly through the columnar mass of adsorbents at a rate controlled below that which would prevent true countercurrent flow of the adsorbent and the liquid oil, withdrawing decolorized oil product from the upper section of said zone, withdrawing the adsorbent along with some of the liquid oil from the lower section of said treating zone, passing the adsorbent as a columnar mass downwardly through a confined washing zone, passing a suitable non-polar solvent upwardly through said columnar mass to effect a countercurrent washing of the adsorbent, withdrawing the solvent and liquid oil removed from said adsorbent from the upper section of said washing zone, fractionating the solvent from the recovered oil and recycling said oil to the lower section of said treating zone, whereby the oil product withdrawn from the upper section of said treating zone is substantially the only liquid oil product ultimately obtained from said zone, withdrawing washed adsorbent bearing solvent and a carbonaceous contaminant from the lower section of said washing zone, heating said adsorbent to drive off the solvent and recovering the latter, passing the dried contaminant bearing adsorbent as a substantially compact column downwardly through a confined regeneration zone and contacting it therein with an oxygen containing gas to effect its regeneration by combustion of the contaminant, controlling the adsorbent temperature during the regeneration so that it reaches temperatures within the range 900–1400° F. at which the contaminant is rapidly removed without sintering the adsorbent, cooling the regenerated adsorbent and returning it to the upper section of said treating zone as the adsorbent charge thereto, and constantly controlling the relationship of temperature, pressure and amount of moisture in all of said zones to prevent the moisture content of the adsorbent from ever substantially exceeding about 4 percent by weight of the adsorbent.

2. A continuous cyclic process for treating oils of low asphalt content to purify the same which comprises: passing an adsorbent of palpable particulate form downwardly as a gravitating column through a confined treating zone, introducing an oil feed of low asphalt content into the lower section of said zone and passing it upwardly through said column to effect the purifying and decolorization of said oil by countercurrent contact with the adsorbent, controlling the operating conditions within said treating zone to maintain a relationship between oil velocity, oil viscosity and adsorbent particle size wherein the oil viscosity Z within said zone never exceeds the maximum defined by the expression $$Z = \frac{250{,}000 D^2}{U}\left(\frac{S_a}{1-F}\right)\left(1-\frac{S_L}{S_T}\right)$$

where Z is the maximum allowable viscosity in centipoises of the oil within the treating zone, D is the average adsorbent particle diameter in inches, U is the superficial velocity of the oil in the treating zone in feet per hour, $S_a$ is the apparent density of the adsorbent in grams per cubic centimeter, F is the fraction of voids between the adsorbent particles under the same mass conditions as $S_a$, $S_T$ is the true density of the adsorbent particles in grams per cubic centimeter and $S_L$ is the oil density within the treating zone in grams per cubic centimeter, withdrawing the purified and decolorized liquid oil from the upper section of said zone, withdrawing adsorbent bearing a coky contaminant from the lower section of said zone along with some entrained liquid oil, passing the adsorbent as a columnar mass downwardly through a confined washing zone while flowing a stream of petroleum naphtha upwardly through said mass to wash the liquid oil from the adsorbent, withdrawing naphtha and liquid oil from the upper section of said washing zone, fractionating the oil from the naphtha and recycling the recovered oil to the lower section of said treating zone so that it is ultimately recovered in the purified product withdrawn from the upper section of said treating zone, passing the washed adsorbent downwardly through a drying zone while heating it by indirect heat exchange in the substantial absence of steam to drive off naphtha from the adsorbent, passing the dried substantially moisture free adsorbent bearing a coky deposit as a substantially compact column downwardly through a confined regeneration zone while subjecting it to an oxygen containing gas to burn off the coky material, controlling the adsorbent temperature in said regeneration zone below a heat damaging level but always in excess of about 300° F. and causing the adsorbent to reach a temperature in excess of about 900° F. at least during a later portion of the deposit burning, cooling the resulting regenerated adsorbent only to a temperature which is near that maintained in said treating zone and returning the adsorbent substantially immediately to said treating zone as the adsorbent charge thereto and controlling the relationship between the temperature, pressure and amount of water present in all parts of the cyclic process to limit the maximum amount of water on the adsorbent at any point in the process below a maximum of 4.5 percent by weight.

3. A continuous cyclic process for neutralizing an acid treated lubricating oil fraction which comprises: passing a granular clay adsorbent made up of particles within the range about 4–100 mesh Tyler as a columnar mass downwardly through a confined treating zone, preheating an acid treated oil and introducing it without previous neutralization into the lower section of said treating zone and causing it to flow upwardly through the columnar mass at a rate limited below that which would interfere with the countercurrent flow of the adsorbent relative to the liquid oil, withdrawing neutralized oil product from the upper section of said treating zone, withdrawing spent adsorbent bearing a carbonaceous deposit along with a substantial amount of entrained liquid oil from the lower section of said zone, separating the entrained oil from the contaminant bearing adsorbent to obtain a spent adsorbent substantially free of recoverable liquid oil and a recycle oil, constituting all of the separated oil, having substantially the same physical and chemical properties of the original feed to said treating zone, returning the recycle oil to said treating zone, whereby said entrained oil is ultimately withdrawn from the upper section of the treating zone as part of the oil product, passing the separated spent adsorbent which is substantially free of moisture and bears substantially only contaminant material which is practicably unrecoverable as purified oil product through a confined regeneration zone while subjecting it to an oxygen containing gas to burn off the coky material, controlling the adsorbent temperature in said regeneration zone below a heat damaging level and causing the adsorbent to reach a temperature in excess of about 900° F. at least during a later portion of the deposit burning, cooling the resulting regenerated adsorbent only to a temperature which is near that maintained in said treating zone and returning the adsorbent substantially immediately to said treating zone in substantially moisture free condition as the adsorbent charge thereto, and controlling the relationship between the temperature, pressure and amount of water present in all parts of the cyclic process to limit the maximum amount of water on the adsorbent at any point in the process below a maximum of about 4.5 percent by weight.

4. A method for decolorizing and treating oils of low asphalt content which comprises: passing an adsorbent of palpable particle form having a substantial sorption capacity for color bodies through a confined treating zone as a columnar mass of downwardly moving particles, introducing an oil feed of low asphalt content into the lower section of said zone and passing it upwardly through said column at a velocity controlled below the columnar mass disrupting velocity, whereby the oil is decolorized by countercurrent contact with the adsorbent, controlling the volumetric rate of adsorbent and oil passage through said treating zone to maintain the volumetric ratio of oil to adsorbent throughput within the range about 0.3 to 30, withdrawing the decolorized and treated oil as product from the upper section of said columnar mass, withdrawing spent adsorbent along with a substantial amount of liquid oil from the lower section of said zone, effecting separation of said liquid oil from the spent adsorbent, said separation being effected at least in part by washing said adsorbent with a suitable solvent with subsequent recovery of the oil from said solvent and said separation leaving on the adsorbent only material which is practically unrecoverable as a liquid product, and continuously recycling all of said separated oil to the lower section of said treating zone so that it is ultimately recovered from the upper section of said zone as part of the decolorized oil product, said decolorized product being the only liquid product obtained.

5. A cyclic continuous process for decolorizing and treating oils of low asphalt content which comprises: passing an adsorbent of palpable particulate form and having a substantial sorption capacity for color bodies through a confined treating zone as a column of downwardly moving particles, introducing the oil feed of low asphalt content into the lower section of said zone and passing it upwardly through said column at a velocity controlled below the column disrupting velocity, whereby the oil is decolorized by countercurrent contact with the adsorbent, withdrawing the decolorized and treated oil as product from the upper section of said column, withdrawing spent adsorbent along with a substantial amount of partially decolorized oil from the lower section of said zone, effecting separation of said partially decolorized oil from the spent adsorbent, said separation being effected at least in part by washing said adsorbent with a suitable solvent with subsequent recovery of the oil from said solvent, recycling at least a major portion of said partially decolorized oil to said treating zone so that it is ultimately recovered from the upper section of said zone as part of the decolorized oil product, passing the separated adsorbent through a regeneration zone while contacting it with a combustion supporting gas below a heat damaging level to reactivate the adsorbent, cooling the adsorbent and returning it to the treating zone as the adsorbent supply therefor, and controlling the relative relationships of temperature, pressure and amount of moisture present in the zones throughout said cyclic process so as to maintain the amount of water deposited on the adsorbent at least below a maximum of about 4.5 percent throughout the cyclic process.

6. A continuous cyclic process for decolorizing lubricating oils which comprises, passing a granular clay type adsorbent as a columnar mass of gravitating granules downwardly through a confined treating zone, introducing a liquid oil feed of low asphalt content into the lower section of said zone and causing it to pass upwardly through the columnar mass of adsorbent to effect transfer of color bodies from the oil to the adsorbent while the oil countercurrently contacts the moving adsorbent mass, controlling the superficial velocity of the oil through said treating zone within the practical range about ½ to 20 feet per hour, controlling the relationship between the viscosity of the oil within the treating zone, the oil velocity in the treating zone, the oil and adsorbent densities in the treating zone and the adsorbent particle size to maintain the oil viscosity in the treating zone always below the maximum defined by the equation:

$$Z = \frac{250{,}000 D^2}{U}\left(\frac{S_a}{1-F}\right)\left(1 - \frac{S_L}{S_T}\right)$$

where Z is the maximum allowable viscosity in centipoises of the oil within the treating zone, D is the average adsorbent particle diameter in inches, U is the superficial velocity of the oil in the treating zone in feet per hour, $S_a$ is the apparent density of the adsorbent in grams per cubic centimeter, F is the fraction of voids between the adsorbent particles under the same mass conditions as $S_a$, $S_T$ is the true density of the adsorbent particles in grams per cubic centimeter and $S_L$ is the oil density within the treating zone in grams per cubic centimeter, whereby the oil velocity is maintained within said practical range without substantial interference with the uniform downward flow of the adsorbent, withdrawing decolorized oil product from the upper section of said treating zone, withdrawing adsorbent along with a restricted amount of entrained oil from the lower section of said zone, said entrained oil having a color at least as low as that of the oil feed to said zone, effecting substantially complete separation of the entrained oil from said adsorbent and recycling at least a major portion of said entrained oil to said treating zone so that it is ultimately recovered from the upper section of said zone as part of the decolorized oil product, effecting regeneration of said adsorbent by burning therefrom carbonaceous contaminants deposited thereon while maintaining the adsorbent temperature below a level which would cause permanent loss of adsorbent decolorizing efficiency, and controlling the relationship between the temperature, pressure and amount of water present in all parts of the cyclic process to limit the maximum amount of water on the adsorbent at any point in the process below a maximum of about 4.5 percent by weight.

7. A continuous cyclic process for treating oils of low asphalt content to remove small amounts of impurities therefrom so as to provide a single purified oil product which comprises: passing an adsorbent in palpable particulate form downwardly as a gravitating column through a confined treating zone, introducing an oil feed of low asphalt content into the lower section of said zone and passing it upwardly through said column countercurrent to the adsorbent flow and without disruption of said column to effect the purifying treatment of said oil by countercurrent contact with the adsorbent, controlling the rates of adsorbent and fresh oil flow through said treating zone to maintain a volumetric throughput ratio of liquid oil to adsorbent within the range 0.3 to 30, withdrawing the purified oil as product from the upper section of said column, withdrawing spent adsorbent bearing a carbonaceous deposit form lower section of said zone along with some entrained liquid oil, effecting separation from the spent adsorbent of substantially all of the practicably recoverable purifiable liquid oil removed with said adsorbent from said treating zone, recycling all of the oil so separated from the adsorbent so as to cause it ultimately to pass upwardly through said treating zone to be purified and recovered from the upper section thereof as a portion of the only liquid product recovered, subjecting the separated adsorbent bearing all the material removed with the adsorbent from the treating zone which remains after the separation of said purifiable oil to heating and to contact with an oxygen containing gas at a temperature of at least 900° F. but below a heat damaging temperature to effect removal of said material by heating and combustion, whereby the adsorbent is regenerated, cooling the regenerated adsorbent and returning it to said treating zone as the adsorbent charge thereto.

8. A continuous cyclic process for treating oils to purify the same which comprises: passing a suitable solid adsorbent of palpable particulate form downwardly as a column of downwardly moving particles through a confined treating zone, introducing an oil feed which is substantially free of entrained water at a suitable treating temperature into the lower section of said zone and passing it upwardly through said column at a velocity below that which would seriously interfere with the flow of the adsorbent granules in a downward direction, whereby the oil is purified by countercurrent contact with the adsorbent, withdrawing the purified oil as product from the upper section of said column, withdrawing spent adsorbent bearing a carbonaceous deposit along with a substantial amount of liquid oil from the lower section of said zone, separating the oil from the contaminant bearing adsorbent, passing the separated spent adsorbent through a confined regeneration zone while subjecting it to an oxygen containing gas to burn off the contaminant material, controlling the adsorbent temperature in said regeneration zone so that it reaches a temperature of at least 900° F. but not a heat damaging temperature, cooling the resulting regenerated adsorbent to a temperature suitable for its introduction to said treating zone, returning the cooled adsorbent to the treating zone as the adsorbent charge thereto and controlling the relationship between the temperature pressure and amount of water present in all parts of the cyclic process to limit the maximum amount of water on the adsorbent at any point in the process below a maximum of about 4.5 percent by weight.

9. In a continuous cyclic process for treating oils of low asphalt content to remove small amounts of impurities therefrom the method which comprises: passing an adsorbent of palpable particulate form downwardly as a gravitating columnar mass through a confined treating zone, introducing an oil feed of low asphalt content into the lower section of said zone and passing it upwardly through said zone to effect transfer of impurities from the oil to the adsorbent while countercurrently contacting the same, controlling the volumetric rate of oil and adsorbent passage through said treating zone to maintain the volumetric ratio of oil to adsorbent throughput within the range about 0.3 to 30, withdrawing purified oil from the upper section of said zone, withdrawing spent adsorbent bearing said impurities from the lower section of said zone along with a substantial amount of entrained liquid oil, effecting separation of the adsorbent from substantially all of the entrained liquid oil removed therewith from said treating zone and recycling the so separated liquid oil to said treating zone so that it is recovered finally in the liquid product withdrawn from the upper section of said zone.

10. The decolorizing process of claim 4 characterized in that the liquid oil separated from said spent adsorbent and recycled to said treating zone is not substantially darker than that of the fresh oil introduced into said treating zone.

11. A continuous cyclic process for decolorizing lubricating oils which comprises: passing an adsorbent made up of particles within the size range about 4–100 mesh Tyler as a columnar mass of gravitating particles downwardly through a confined treating zone, introducing a liquid oil feed of low asphalt content into the lower section of said zone and causing it to pass upwardly through the columnar mass of adsorbents in true countercurrent flow relationship to the adsorbent, controlling the rate of adsorbent and oil passage through said treating zone to maintain the volumetric ratio of oil to adsorbent throughput within the range 0.3–30, withdrawing decolorized oil product from the upper section of said zone, withdrawing the adsorbent and a limited amount of entrained and liquid oil from the lower section of said treating zone; effecting removal of the liquid oil from the withdrawn adsorbent, the removal being effected substantially completely by washing said adsorbent with naphtha, separating naphtha and liquid oil from the adsorbent bearing naphtha and carbonaceous contaminant, and fractionating the liquid oil from the napha; returning all of the recovered oil to the lower section of said treating zone, so that it is ultimately recovered from the upper section of said zone as part of the decolorized oil product; heating the separated adsorbent to drive off therefrom the naphtha; passing the dried adsorbent bearing substantially all of the material removed from the treating zone therewith other than said recovered oil downwardly as a substantially compact column through a confined regeneration zone while subjecting it to an oxygen containing gas to burn off the deposited material, controlling the adsorbent temperature in said regeneration zone below a heat damaging level and causing the adsorbent to reach a temperature in excess of about 900° F. at least during a later portion of the deposit burning, cooling the resulting regenerated adsorbent only to a temperature which is near that maintained in said treating zone and returning the adsorbent substantially immediately to said treating zone, and controlling the operating variables within said treating zone to maintain the viscosity of the oil passing upwardly through said zone below a maximum defined by the relationship $$Z = \frac{250{,}000 D^2}{U}\left(\frac{S_a}{1-F}\right)\left(1-\frac{S_L}{S_T}\right)$$

where Z is the maximum allowable viscosity in centipoises of the oil within the treating zone, D is the average adsorbent particle diameter in inches, U is the superficial velocity of the oil in the treating zone in feet per hour, $S_a$ is the apparent density of the adsorbent in grams per cubic centimeter, F is the fraction of voids between the adsorbent particles under the same mass conditions as $S_a$, $S_T$ is the true density of the adsorbent particles in grams per cubic centimeter and $S_L$ is the oil density within the treating zone in grams per cubic centimeter.

12. In a continuous cyclic process for treating petroleum fractions of low asphalt content to remove small amounts of impurities therefrom the method which comprises: passing an adsorbent in palpable particle form downwardly as a gravitating column through a confined treating zone; introducing a petroleum fraction of low asphalt content into the lower section of said zone and passing it upwardly through said column at a rate sutiable for effecting the removal of the impurities from the petroleum fraction; controlling the superficial velocity of the petroleum stream passing through said column at a practicable rate within the range about ½ to 20 feet per hour while avoiding substantial disruption of said column at said rate by maintaining the viscosity of said petroleum fraction as it passes through the column in said treating zone below the maximum expressed by the equation:

$$Z = \frac{250{,}000 D^2}{U}\left(\frac{S_a}{1-F}\right)\left(1-\frac{S_L}{S_T}\right)$$

where in said equation Z is the maximum allowable viscosity in centipoises of the petroleum fraction within the treating zone, D is the average adsorbent particle diameter in inches, U is the superficial velocity of the petroleum fraction in the treating zone in feet per hour, $S_a$ is the apparent density of the adsorbent in grams per cubic centimeter, F is the fraction of voids between the adsorbent particles under the same conditions, $S_T$ is the true density of the adsorbent particles in grams per cubic centimeter and $S_L$ is the density of the petroleum fraction within the treating zone in grams per cubic centimeter, whereby the petroleum fraction flows through said column at the aforesaid velocity without substantial disruption of said column; controlling the volumetric rate of adsorbent and oil passage through said treating zone to maintain the volumetric ratio of oil to adsorbent throughput within the range about 0.3 to 30, withdrawing the purified petroleum fraction as product from the upper section of said column; withdrawing spent adsorbent from the lower section of said zone along with a substantial amount of the petroleum fraction; effecting separation of the adsorbent from substantially all of the petroleum fraction removed therewith from said treating zone and recycling said separated petroleum fraction to said treating zone so that it is recovered finally in the liquid product withdrawn from the upper section of said zone.

13. A process for treating domestic fuel oils to remove small amounts of undesirable impurities therefrom which comprises: passing an adsorbent of palpable particle form through a confined treating zone as a column of downwardly moving particles, introducing a light fuel oil feed into the lower section of said treating zone and passing it upwardly through said column at a superficial velocity controlled below the column disrupting velocity and within the range about ½ to 20 feet per hour whereby impurities are removed from said oil and deposited on the adsorbent, maintaining the oil viscosity in said zone below the maximum defined by the equation, $$Z = \frac{250{,}000 D^2}{U}\left(\frac{S_a}{1-F}\right)\left(1-\frac{S_L}{S_T}\right)$$

thereby avoiding disruption of said column by the oil passing at the selected velocity, where in said equation Z is the maximum allowable viscosity in centipoises of the oil within the treating zone, D is the average adsorbent particle diameter in inches, U is the superficial velocity of the oil in the treating zone in feet per hour, $S_a$ is the apparent density of the adsorbent in grams per cubic centimeter, F is the fraction of voids between the adsorbent particles under the same mass conditions as $S_a$, $S_T$ is the true density of the adsorbent particles in grams per cubic centimeter and $S_L$ is the oil density within the treating zone in grams per cubic centimeter, withdrawing a purified fuel oil product from the upper section of said treating zone, controlling the volumetric rate of adsorbent and oil passage through said treating zone to maintain the volumetric ratio of oil to adsorbent throughput within the range about 0.3 to 30, withdrawing the adsorbent bearing impurities from the lower section of said zone along with a limited amount of fuel oil, effecting separation of said fuel oil from the withdrawn adsorbent, leaving on the adsorbent only material which is practically unrecoverable as a liquid product and recycling the separated fuel oil to said treating zone so that it is ultimately recovered as part of said fuel oil product withdrawn from the upper section of said treating zone.

14. A continuous cyclic process for decolorizing lubricating oils which comprises: passing a suitable decolorizing adsorbent of palpable particulate form as a columnar mass of gravitating particles downwardly through a confined treating zone, introducing a liquid oil feed of low asphalt content into a lower section of said zone and causing it to pass upwardly through the columnar mass of adsorbent to effect transfer of color bodies from the oil to the gravitating adsorbent particles, controlling the rate of liquid flow below that which would disrupt the columnar mass to an extent which would prevent true countercurrent flow of adsorbent and liquid oil and controlling the rates of adsorbent and oil throughput through said treating zone to maintain a volumetric throughput ratio of liquid oil to adsorbent within the range about 0.3 to 30, withdrawing decolorized oil product from the upper section of said zone, withdrawing the adsorbent bearing carbonaceous deposit from the lower section of said zone along with some entrained liquid oil, effecting separation from the spent adsorbent of the practicably recoverable decolorizable liquid oil removed with said adsorbent from said treating zone, recycling to said treating zone substantially all of the oil so separated from the adsorbent so that it is ultimately recovered from the upper section of said treating zone as part of said decolorized oil product, subjecting the separated adsorbent bearing all of the material removed from the treating zone with said adsorbent except said decolorizable oil to heating and to contact with an oxygen containing gas at a temperature of at least 900° F. but below a heat damaging temperature to effect removal of said material by heating and combustion, whereby the adsorbent is regenerated, cooling the regenerated adsorbent and returning it to said treating zone as the adsorbent charge thereto.

References Cited in the file of this patent

UNITED STATES PATENTS

| | | |
|---|---|---|
| 1,946,748 | Lemmon et al. | Feb. 13, 1934 |
| 2,446,799 | Winding | Aug. 10, 1948 |
| 2,470,339 | Claussen et al. | May 17, 1949 |
| 2,552,435 | Knox et al. | May 8, 1951 |
| 2,572,433 | Bergstrom et al. | Oct. 23, 1951 |
| 2,664,202 | Bartleson | Dec. 29, 1953 |